United States Patent
Janson et al.

(10) Patent No.: US 7,537,534 B2
(45) Date of Patent: May 26, 2009

(54) HYBRID ELECTRIC DRIVE SYSTEM FOR A MOTOR VEHICLE

(75) Inventors: David A. Janson, Plymouth, MI (US); Reid A. Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 562 days.

(21) Appl. No.: 11/434,387

(22) Filed: May 15, 2006

(65) Prior Publication Data

US 2007/0261901 A1 Nov. 15, 2007

(51) Int. Cl.
F16H 3/72 (2006.01)
(52) U.S. Cl. .......................................................... 475/5
(58) Field of Classification Search .................. 475/5; 74/661; 180/65.2, 65.6
See application file for complete search history.

(56) References Cited

U.S. PATENT DOCUMENTS

| | | | |
|---|---|---|---|
| 5,285,111 A | 2/1994 | Sherman | |
| 5,697,466 A | 12/1997 | Moroto et al. | |
| 5,718,300 A | 2/1998 | Frost | |
| 5,846,155 A | 12/1998 | Taniguchi et al. | |
| 5,988,307 A | 11/1999 | Yamada et al. | |
| 6,081,042 A | 6/2000 | Tabata et al. | |
| 6,488,108 B1 | 12/2002 | Boll | |
| 6,488,608 B2 | 12/2002 | Yamaguchi et al. | |
| 6,540,636 B2 | 4/2003 | Amanuma et al. | |
| 6,638,193 B2 * | 10/2003 | Hamai | 475/5 |
| 6,655,484 B2 | 12/2003 | Levin | |
| 6,777,837 B2 | 8/2004 | Tsuzuki et al. | |
| 6,837,816 B2 | 1/2005 | Tsai et al. | |
| 6,880,664 B2 * | 4/2005 | Pecnik et al. | 180/243 |
| 2002/0094899 A1 * | 7/2002 | Hamai | 475/5 |
| 2004/0011576 A1 | 1/2004 | Taniguchi et al. | |
| 2004/0176203 A1 | 9/2004 | Supina et al. | |
| 2006/0113127 A1 | 6/2006 | Dong et al. | |

FOREIGN PATENT DOCUMENTS

| | | |
|---|---|---|
| DE | 2732974 | 1/1979 |
| EP | 0458005 | 11/1991 |
| EP | 1294981 B1 | 3/2003 |

* cited by examiner

*Primary Examiner*—Dirk Wright
(74) *Attorney, Agent, or Firm*—David B Kelley; MacMillan, Sobanski & Todd, LLC

(57) ABSTRACT

A system for driving the wheels of a motor vehicle includes an engine or another prime mover, a transmission for transmitting rotary power to and from the engine, an electric machine, a clutch driveably connected to an output of the transmission; and a gearset driveably connected to the electric machine, the transmission output and the clutch, for transmitting rotary power between the electric machine and at least one of the transmission output and the clutch.

20 Claims, 3 Drawing Sheets

| FUNCTION | ENGINE 32 | TC LOCKUP CLUTCH 94 | TRANSMISSION 34 | ELECTRIC MACHINE 38 | REAR CLUTCH 72 |
|---|---|---|---|---|---|
| GENERATE | ON | LOCK | DRIVE | GENERATOR | OFF |
| ELECTRIC LAUNCH | OFF | OPEN | NEUTRAL | MOTOR | ON |
| ENGINE START | ON | LOCK | DRIVE | MOTOR | SLIP |
| TORQUE BOOST | ON | OPEN LOCK | DRIVE | MOTOR | ON |
| REGENERATE BRAKES | OFF OR ON | OPEN | NEUTRAL | GENERATOR | ON |

HYBRID ELECTRIC DRIVE SYSTEM FOR A MOTOR VEHICLE

BACKGROUND OF THE INVENTION

This invention relates generally to a drive system for a hybrid electric motor vehicle. More particularly, it relates to a drive system having two power sources, preferably an internal combustion engine and an electric machine.

To reduce the volume of pollutants exhausted into the air by automotive powertrains driven exclusively by an internal combustion engine, hybrid powertrains that include an electric motor and an IC engine, which operate independently or and in combination, have been developed.

Most electric hybrid vehicles currently available commercially are front wheel drive (FWD) vehicles, in which only the front wheels are driven. A need exists for hybrid electric powertrains applicable to rear wheel drive (RWD) vehicles, four-wheel drive (4WD), and all-wheel drive (AWD) vehicles. Current designs for hybrid electric RWD and AWD applications involve the use of multiple electric machines, each of which operates alternately as a motor and a generator. Often these designs require extensive modification of a transmission, which transmits power to the rear wheels or to a transfer case located rearward of the transmission.

A need exists for a low-cost, hybrid electric powertrain that can be fitted to an existing automatic RWD transmission. To minimize cost, a single electric machine would provide all hybrid functions including electric energy generation, electric vehicle launch, engine starting, electric boosting of engine power, and regenerative braking.

SUMMARY OF THE INVENTION

A hybrid electric drive system according to a preferred embodiment is applicable to RWD, AWD and 4WD vehicles. It employs conventional powertrain components, minimizes package space, can be manufactured and assembled and used for low-cost, virtually without modification to a RWD transmission, except that the transmission includes an auxiliary oil pump, which provides hydraulic control functionality while the engine is not rotating.

The drive system includes only one electric machine and one inverter. The electric machine operates alternately as a motor and an electric generator, and it provide all the hybrid electric functions including electric energy generation, electric vehicle launch, engine starting, electric boosting of engine power, and regenerative braking.

The electric machine is coaxial with the transmission output shaft. The stator is located in a housing attached to the rear face of an automatic transmission, thereby providing support for a major portion of the weight of the electric machine.

The rotor drives the sun gear of a planetary gearset located behind the electric machine. The carrier of the planetary gearset is driven by the transmission output shaft. The ring gear of the planetary gearset is grounded to the electric machine housing. A rear drive clutch driveably connects the planetary gearset carrier to the vehicle driveshaft. The driveshaft is connected to the rear wheels thru a conventional axle having a ring and pinion set and a differential mechanism.

The transmission provides drive and neutral states, which in conjunction with a rear drive clutch, allow the electric machine to function as a generator, an engine start motor/generator, an electric launch motor/generator, a torque boosting motor/generator, and a regenerative braking generator. When operating as a generator, the transmission is in a drive gear, the torque converter lockup clutch is locked, the rear clutch is be open and the electric machine operates in electric generation mode.

To launch the vehicle using an electric power source, the rear clutch is closed, the transmission is in its neutral range, and the electric machine provides output torque to the driven wheels.

To start the engine, the transmission is in a drive gear, the rear clutch produces a predetermined slip torque, and the electric machine provides both engine start torque and vehicle drive torque.

To add electric machine torque while using the engine to driving the wheels, the electric machine is energized while the transmission is in the drive range, and the rear clutch is closed.

To provide regenerative braking, the transmission is in neutral, the rear clutch is closed, and the electric machine operates in electric generation mode.

In a preferred embodiment, a system for driving the wheels of a motor vehicle includes an engine or another prime mover, a transmission for transmitting rotary power to and from the engine, an electric machine, a clutch driveably connected to an output of the transmission; and a gearset driveably connected to the electric machine, the transmission output and the clutch, for transmitting rotary power between the electric machine and at least one of the transmission output and the clutch.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
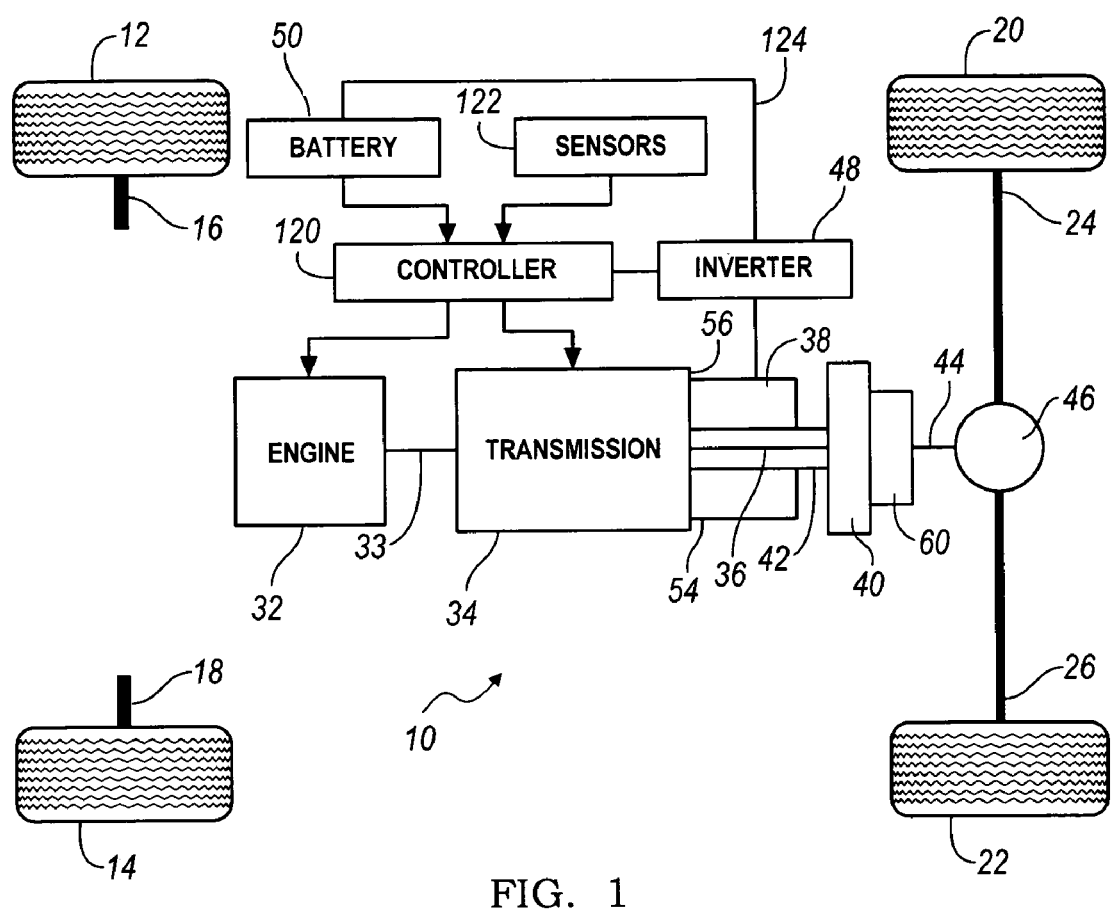
FIG. 1 is a schematic diagram of a drive system for a hybrid electric vehicle.

FIG. 1 illustrates a drive system 10 for a hybrid electric vehicle, in which power is transmitted to the rear wheels. The vehicle is supported on front wheels 12, 14, connected by front axle shafts 16, 18 to the chassis of the vehicle, and on rear wheels 20, 22, connected by rear shafts 24, 26, respectively. The rear shafts 24, 26 may be halfshafts. The front axles 16, 18 are not driveably connected to a prime mover or power source in the RWD system 10 of FIG. 1.

A first power source 32, a heat engine such as an internal combustion engine, produces rotary power, which is transmitted to the rear wheels 20, 22 and rear shafts 24, 26 when the drive system is operating in a positive torque condition, i.e., when power is transmitted from the power sources to the driven wheels. An electric machine 38, the second power source, produces rotary power, which is transmitted also to the rear wheels 20, 22 and rear shafts 24, 26 when the drive system is operating in a positive torque condition. During a negative torque condition, power is transmitted from the driven wheels to the power sources.

The IC engine 32 is driveably connected to the input 33 of a transmission 34. The transmission output shaft 36 passes through an electric machine 38 to the input of a gear/clutch unit 40, located at the rear of the electric machine. Similarly, the electric machine 38 is driveably connected by a shaft 42 to the gear/clutch unit 40. The shaft 42 of the electric machine is preferably a sleeve shaft, which provides a space for the rear drive shaft 36 to pass through to the gear/clutch unit 40. The output of gear/clutch unit 40 is driveably connected by a rear driveshaft 44 to the rear wheels 20, 22 through a rear axle assembly, which includes an inter-wheel differential mechanism 46, which transmits power differentially to the right and left rear shafts 24, 26, each of which extends laterally from the differential 46 to a rear wheel.

The electric machine 38, which is electrically connected to an inverter 48, can operate in a drive state, a charging state, and an off state. When the electric machine 38 operates in the drive state, the inverter 48 converts direct current from an electric storage battery 50 to alternating current, which is supplied to the electric machine. When the electric machine 38 operates in the charging state, the inverter 48 converts alternating current produced by the electric machine to direct current, which is supplied to and stored in the battery 50. When the electric machine 38 operates in the off state, the electric machine 38 is inoperative and its shaft 42 rotates freely.

Figures 2, 4:
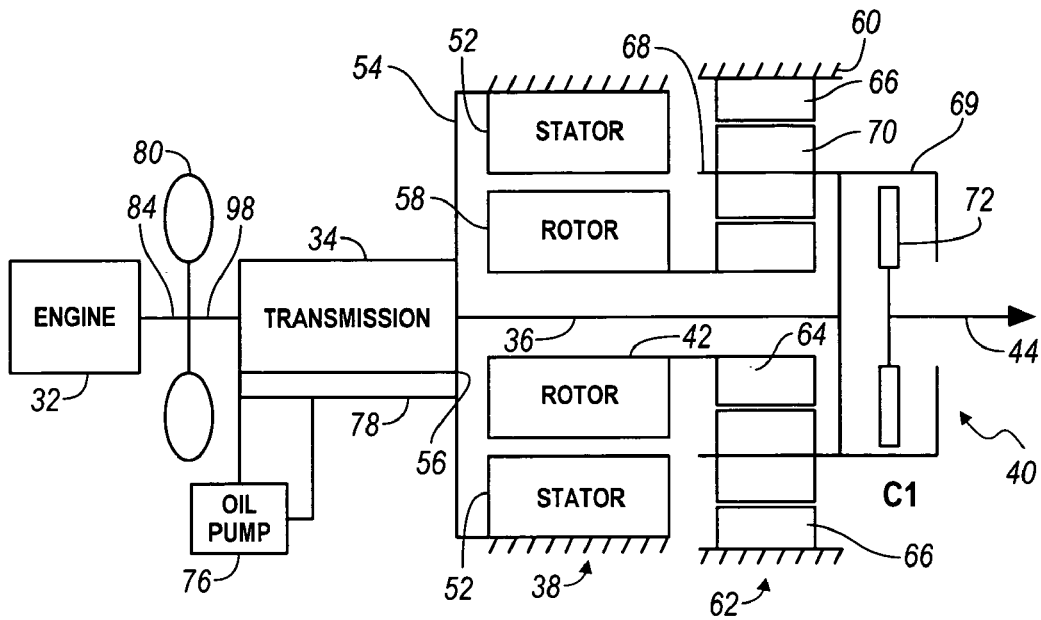
FIG. 2 is schematic diagram of a portion of the drive system of FIG. 1.
FIG. 4 is a chart showing the operating state of components of the drive system during various functional states.

Referring now to FIG. 2, the electric machine 38 is coaxial with the transmission output and rear drive shaft 36. The electric machine 38 includes a stator 52, located in a housing 54 attached to the rear face 56 of the automatic transmission 34, and a rotor 58, secured to shaft 42 for rotation as a unit.

The gear/clutch unit 40, which is enclosed in a housing 60, includes a simple planetary gearset 62 comprising a sun gear 64 secured to shaft 42 and driven by the rotor 58 of the electric machine 38; a ring gear 66 held against rotation on the housing 60; a planet pinion carrier 68 driveably connected to the transmission output shaft 36; and a set of planet pinions 70 supported for rotation on the carrier 68. When sun gear 64 is driven by rotor 58, carrier 68 is underdriven, i.e., it rotates slower than the sun gear.

The gear/clutch unit 40 also includes a rear clutch 72, which includes a clutch housing 69, the input of the rear clutch. Housing 69 is driveably connected to the transmission output shaft 36 and is secured to carrier 68. When rear clutch 72 is engaged, it driveably connects the transmission output shaft 36 and carrier 68 to the rear driveshaft 44, the output of the rear clutch 72. When rear clutch 72 is disengaged, it disconnects the transmission output shaft 36 and carrier 68 from the rear driveshaft 44.

Preferably, the transmission 34 is an automatic transmission, which includes an electrically driven auxiliary oil pump 76, supplied with transmission fluid, such as ATF contained in the sump 78 of the transmission housing. Pressurized fluid from pump 76 provides lubricant to, and hydraulic control of the transmission components while the engine 32 is off and not rotating. The transmission 34 operates in drive and neutral states, which, in conjunction with the rear clutch 72, allows the electric machine 38 to function as a generator, an engine start motor/generator, an electric launch motor/generator, a torque boosting motor/generator, and a regenerative braking generator.

Figure 3:
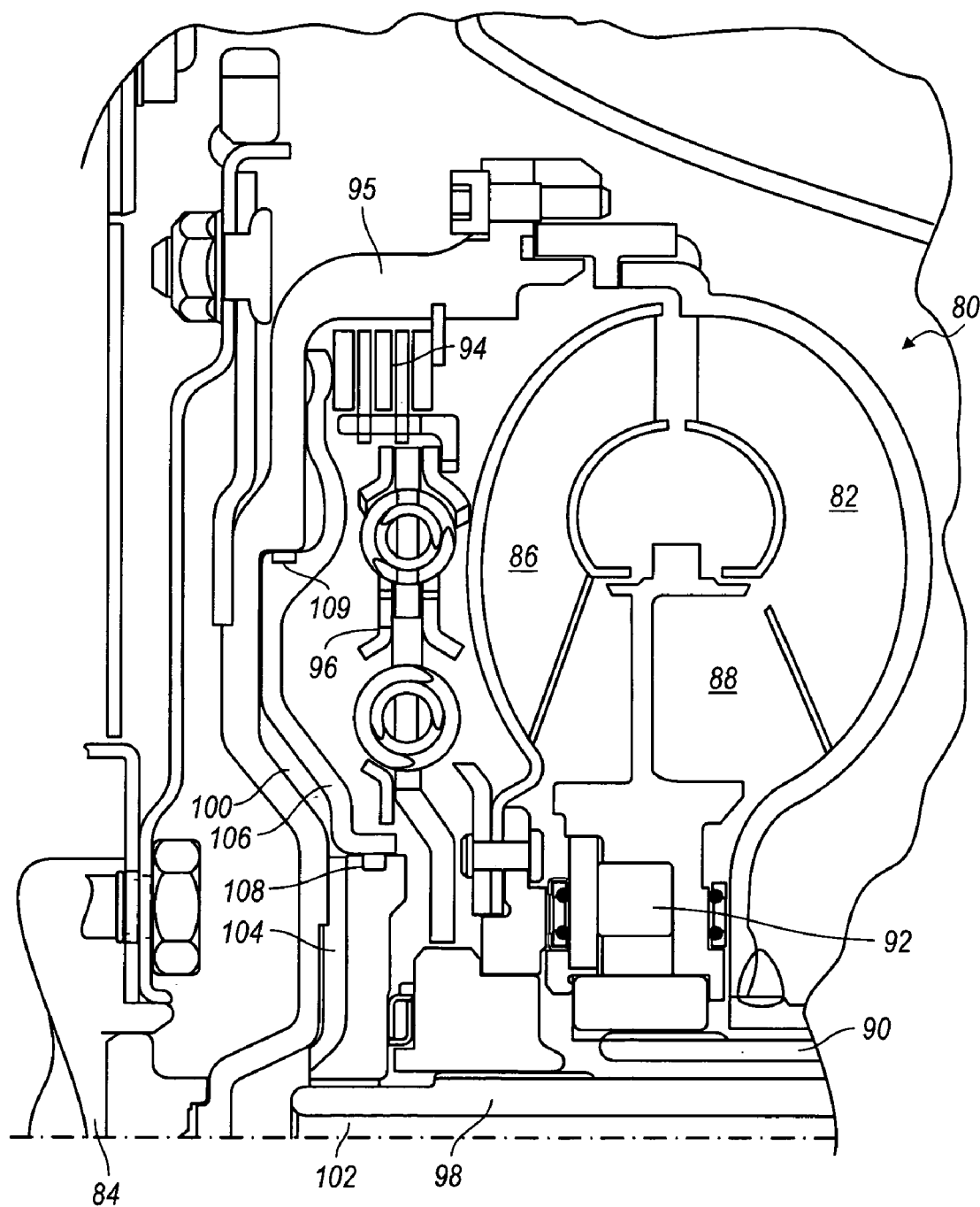
FIG. 3 is a cross section of the torque converter shown I FIG. 2.

If the transmission 34 is a step-change automatic transmission, its torque converter 80 includes a bladed impeller wheel 82 connected to the crankshaft 84 of the IC engine 32, a bladed turbine wheel 86, and a bladed stator wheel 88, as illustrated in FIG. 3. The impeller, stator and turbine wheels define a toroidal fluid flow circuit, whereby the impeller is hydrokinetically connected to the turbine 86. An overrunning brake 92 anchors the stator to shaft 90, thereby preventing rotation of the stator 88 in a direction opposite the direction of rotation of the impeller 82, although free-wheeling motion in the opposite direction is permitted.

The torque converter assembly 80 includes a bypass or lockup clutch 94, located within the torque converter housing 95. The torque output side of lockup clutch 94 includes a damper 96, located between the turbine and a turbine shaft, which is the transmission input shaft 33. The damper 96 may incorporate dual or single-stage compression springs.

The damper 96 is directly connected at one end to the turbine wheel 86 and at the other end to input shaft 33. The bypass clutch 94 is connected between the housing 95 and damper 96. When clutch 94 is slipping, i.e., there is a speed difference across the clutch, damper 96 attenuates transitory torque fluctuations from the crankshaft 84 to input shaft 33. When clutch 94 is disengaged, the torque converter 80 mitigates transient torque disturbances.

The clutch 94 is alternately engaged and disengaged in accordance with the magnitude of clutch apply pressure communicated to a hydraulic cylinder 100 through an axial passage 102, formed in the input shaft 98 and a radial passage 104. A closed piston 106, sealed on housing 95 by O-rings 108 and 109, moves rightward within cylinder 100 to force the clutch discs into mutual frictional contact, and leftward to allow the discs to disengage mutually.

When clutch 94 is engaged, the turbine and impeller are mechanically connected and hydrokinetically disconnected; when clutch 94 is disengaged, the turbine and impeller are hydrokinetically connected and mechanically disconnected. Fluid contained in the torque converter 80 is supplied from the output of an oil pump and is returned to the oil sump 78, to which an inlet of the pump 76 is connected hydraulically.

The transmission 34 may be an automatic, manual, or semi-automatic transmission, each of which produces multiple, discrete ratios of the speed of its output 36 divided by the speed of its input 98. The speed ratios are changed in steps. The automatic transmission includes a lockup clutch 94 for connecting and disconnecting the engine shaft 84 and transmission input shaft 33. Manual and semi-automatic transmissions include an input clutch for connecting and disconnecting the engine shaft 84 and transmission input shaft. Alternatively, the transmission 34 may be a continuously variable transmission, such as a traction drive or belt drive transmission, which varies the operating speed ratio steplessly.

An electronic controller 120 communicates with sensors 122, inverter 48, electric machine 38, engine 32, rear clutch 72, and transmission 34 on the vehicle's multiplex bus 124. The controller 120 receives electronic signals produced by the sensors representing operating parameters of the drive system. The controller 120 executes control algorithms and issues electronic command signals, to which the components of the drive system respond such that the functions of the drive system are produced.

Referring now to FIG. 4, when the drive system functions as a generator to supply and store electric energy in the battery 50, the engine 32 is on; transmission 34 operates in a drive gear, preferably a forward gear; the torque converter clutch 94 or an alternate clutch is engaged or locked; the rear clutch 72 is disengaged or open; and the electric machine 38 operates in the charging state as an electric generation. Power is transmitted from the engine shaft 84, through the torque converter lockup clutch 94, transmission 34 and its output shaft 36 to the carrier 68, and sun gear 64, which drives the rotor 58. No power is transmitted to the rear wheels 20, 22, due to clutch 72 being open.

To launch the vehicle from a stop condition using an electric power source, the engine 32 is off, the rear clutch 72 is closed or engaged, the transmission 34 is in its neutral drive range, and lockup clutch 94 is open. Therefore, no power is transmitted from the engine to the rear wheels 20, 22. Instead, the electric machine 38 drives the rear wheels through the rear clutch 72.

To start the engine using the electric power source, the lockup clutch 94 is engaged; the transmission 34 operates in a drive gear; the rear clutch 72 operates at a predetermined slip torque capacity, such that a speed difference is produced across the clutch 72; the battery 50 provides electric power to the electric machine 38, and the electric machine provide both engine start torque and vehicle drive torque. In this mode, the vehicle is being driven by the electric machine 38, and while being so driven, the engine is started as described. The electric machine 38 provides both engine start torque and vehicle drive torque.

The engine can also be started by the system without the vehicle being driven by the electric machine 38. To start the engine with the vehicle stopped, clutch 72 is fully disengaged or opened, lockup clutch 94 is engaged; the transmission 34 operates in a drive gear; and the battery 50 provides electric power to the electric machine 38. In either case, the power to crank the engine is transmitted along a path that includes the rotor 58, sun gear 64, carrier 68, carrier housing 69, transmission output shaft 36, transmission 34, transmission input shaft 98, damper 96, torque converter lockup clutch 94, torque converter housing 95, and engine shaft 84.

With the engine operating and transmitting power through the torque converter 80, transmission 34 and gear/clutch unit 40 to the differential 46, the electric machine 38 can be used to increase torque transmitted to the differential 46. To accomplice this result, the engine is on, the transmission is operating in a drive gear with the lockup clutch 94 either on or off, the clutch housing 69 is driven by transmission output shaft 36, the rear clutch 72, which is fully engaged, transmits power to the rear drive shaft 44 and differential 46. To increase output torque to the differential 46, inverter 48 converts direct current from the battery 50 and supplies alternating current to the electric machine 38. The rotor 58 drives sun gear 64, and carrier 68 is underdriven in relation to the speed of the rotor. Torque carried on the transmission output shaft 36 to the clutch housing 69, and torque carried on carrier 68 are combined at rear clutch 72, which transmits the combined power to rear drive shaft 44 and differential 46.

To recover kinetic energy of the vehicle while providing braking torque to the driven wheels 20, 22, a condition called regenerative braking, the engine 32 is either on or off, the torque converter lockup clutch 96 is open or disengaged, the transmission 34 operates in its neutral range, the rear clutch 72 is fully engaged, and the electric machine 38 operates in its charging state as a generator. The rear wheels 20, 22 transmit torque through differential 46 and rear clutch 72 to carrier 68. The sun gear 64 and rotor 58 are overdriven relative to the speed of carrier 68. Inverter 48 converts alternating current produced by the electric machine 38 to direct current, which is stored in battery 50.

In accordance with the provisions of the patent statutes, the preferred embodiment has been described. However, it should be noted that the alternate embodiments can be practiced otherwise than as specifically illustrated and described.

What is claimed is:

1. A drive system for a motor vehicle, comprising:
   a power source;
   a clutch for alternately driveably connecting and disconnecting a clutch input and a clutch output;
   a transmission including a transmission input driveably connected to the power source, and a transmission output driveably connected to the clutch input;
   an electric machine including a rotor;
   a gearset including a gearset input driveably connected to the rotor and a gearset output driveably connected to the clutch input.

2. The drive system of claim 1 wherein the gearset causes a speed of the gearset output to be greater than a speed of the gearset input.

3. The drive system of claim 1 wherein the gearset includes:
   a sun gear driveably connected to the rotor;
   a ring gear held against rotation;
   a carrier driveably connected to the clutch input; and
   planet pinions supported for rotation on the carrier and meshing with the sun gear and the ring gear.

4. The drive system of claim 1 further comprising:
   an electric storage battery; and
   an inverter electrically communicating with the electric machine and battery, for converting electric current between D.C. and A.C.

5. The drive system of claim 1 wherein the transmission further comprises:
   a lockup clutch for alternately driveably connecting and disconnecting the engine and the transmission input.

6. The drive system of claim 1 wherein the transmission further comprises:
   a torque converter that produces a hydrokinetic drive connection between the engine and the transmission input; and
   a lockup clutch for alternately driveably connecting and disconnecting the engine and the transmission input.

7. The drive system of claim 1 wherein the transmission further comprises:
   first and second driven wheels;
   a differential mechanism driveably connected to the clutch output for transmitting power differentially to the first and second driven wheels.

8. The drive system of claim 1 wherein the first power source is an internal combustion engine.

9. The drive system of claim 1 wherein the transmission includes a clutch for alternately connecting and disconnecting the engine and the transmission input, and the transmission is one of an automatic transmission, a manual transmission, and a semi-automatic transmission for producing step changes in speed ratio, and a continuously variable transmission for producing stepless changes in speed ratio.

10. The drive system of claim 1 wherein the electric machine operates alternately as a motor and an electric generator.

11. A system for driving the wheels of a motor vehicle, comprising:
   an engine;
   a transmission for transmitting rotary power to and from the engine, the transmission including a housing;
   an electric machine supported on the transmission housing;
   a clutch driveably connected to an output of the transmission; and a gearset driveably connected to the electric machine, the transmission output and the clutch, for transmitting rotary power between the electric machine and at least one of the transmission output and the clutch.

12. The system of claim 11, further including:
first and second driven wheels;
a differential mechanism driveably connected to the clutch for transmitting power differentially to the first and second driven wheels.

13. The system of claim 11, wherein:
the gearset causes a speed of the transmission output to be less than a speed of the electric machine when the gearset transmits power between the transmission output and the electric machine, causes the speed of the clutch to be less than a speed of the electric machine when the gearset transmits power between the electric machine and the clutch.

14. The drive system of claim 11 wherein the gearset includes:
a sun gear driveably connected to the electric machine;
a ring gear held against rotation;
a carrier driveably connected to the clutch; and
planet pinions supported for rotation on the carrier and meshing with the sun gear and the ring gear.

15. The drive system of claim 11 further comprising:
an electric storage battery; and
an inverter electrically communicating with the electric machine and battery, for converting electric current between D.C. and A.C.

16. The drive system of claim 11 wherein the transmission further comprises:
a lockup clutch for alternately driveably connecting and disconnecting the engine and an input of the transmission.

17. The drive system of claim 11 wherein the transmission further comprises:
a torque converter that produces a hydrokinetic drive connection between the engine and the transmission input; and
a lockup clutch for alternately driveably connecting and disconnecting the engine and the transmission input.

18. The drive system of claim 11 further comprises:
first and second driven wheels;
a differential mechanism driveably connected to the clutch output for transmitting power differentially to the first and second driven wheels.

19. The drive system of claim 11 wherein the first power source is an internal combustion engine.

20. The drive system of claim 11 wherein the electric machine operates alternately as a motor and an electric generator.

* * * * *